April 5, 1938.  A. J. WILLIAMS, JR  2,113,164
RECORDER AND CONTROL CIRCUITS
Filed Sept. 22, 1932  4 Sheets-Sheet 1

Patented Apr. 5, 1938

2,113,164

UNITED STATES PATENT OFFICE 2,113,164

RECORDER AND CONTROL CIRCUITS

Albert J. Williams, Jr., Philadelphia, Pa., assignor to Leeds & Northrup Company, Philadelphia, Pa., a corporation of Pennsylvania Application September 22, 1932, Serial No. 634,425

74 Claims. (Cl. 172—239)

My invention relates to a method of and apparatus for determining or measuring the magnitude, or the departure from a given magnitude, or for maintaining a predetermined magnitude, of a condition, such as thermal, electrical, mechanical, physical, chemical, etc., and more particularly to systems in which an effect, such as an electromotive force, which varies in accordance with the variation in magnitude of the condition, causes the actuation of apparatus for indicating, recording, control or various other purposes.

In accordance with one aspect of my invention, in a system having an electromotive force varying in accordance with the variation in magnitude of a condition to be determined, or in accordance with the departure from a predetermined magnitude of the condition, the current flow set up by the electro-motive force is periodically varied in such manner that it may be amplified by a thermionic amplifier, or equivalent, and the amplified current employed to actuate structure in accordance with the magnitude of the condition; specifically, in a circuit in which a feeble direct current is caused to flow when the circuit is unbalanced, which current varies in voltage and direction in accordance with the departure from a predetermined magnitude of temperature, humidity, speed, pressure, or other condition, the current flows through a resistance varying device, as a microphone, or equivalent, the resistance of which is periodically varied at the frequency of a given source of alternating current, the resultant current or its alternating current component being impressed upon the input circuit of a thermionic amplifier, and the output of the amplifier applied to a relay, galvanometer, motor, or equivalent, connected to said alternating current source to cause actuation of such structure in accordance with the magnitude of the amplified current and/or its phase relation with respect to the alternating current source; more specifically, the relay, galvanometer or motor controls the operation of various devices, such as a potentiometer recorder, or a valve for controlling the fuel supply, draft, or other agent for establishing the magnitude of the condition.

Further in accordance with my invention, in a circuit having a feeble direct current flowing therein and varying in magnitude and direction in accordance with the magnitude, or the departure from a predetermined magnitude, of a condition, and in which the current is periodically varied so that it may be amplified, a current varying device is employed which is not in itself a source of current or voltage, and is not subject to heating effects, or to inductive effects of magnetic or electric fields, which are apt to further vary the current and introduce error in the system, specifically, a microphone is employed to periodically vary the direct current so that the same may be amplified by a thermionic amplifier, the output of the amplifier being connected to a relay, galvanometer, motor, or other responsive device.

Further in accordance with my invention, an electromotive force which varies in accordance with the departure from a predetermined magnitude of a condition to be detected or controlled is periodically varied so that it becomes alternating in character to effect any suitable or desirable control or actuation of an alternating current actuated relay, galvanometer, motor, recorder, or other device responsive to alternating current; specifically, an electromotive force which varies in amplitude and direction in accordance with the departure from a predetermined magnitude of a condition, is periodically varied in amplitude and changed into an alternating current having a predetermined phase relation, with respect to the alternating current supply source powering a relay, galvanometer, reversible motor, etc., and so applied that the position, rate and/or direction of movement of the armature or rotor of such device at any instant will be in accordance with the magnitude of the condition.

Further in accordance with some forms of my invention, the motor or equivalent, which restores the measuring system to balance after change in the condition under measurement, operates at speeds substantially proportional to the extents of unbalance, i. e. the speed of rebalancing is great at the beginning of the rebalancing operation, and is greater the larger the change in the condition, and progressively decreases as balance of the system for the new magnitude of the condition is approached.

In accordance with one form of my invention, the motor is controlled by Thyratron tubes, which preferably are provided with a de-sensitizing network to compensate for the tendency of the tubes to be more sensitive for closely following voltage impulses than for more widely separated impulses.

My invention further resides in the method and apparatus of the character hereinafter described and claimed.

For an understanding of my invention, and some of the various forms it may take, reference is had to the accompanying drawings in which:

Figs. 1a and 1b show typical circuits which may be employed to produce an electromotive force which varies in accordance with the magnitude of a condition;

Figs. 1c and 1d are typical damping devices;

In systems for determining or controlling the temperature of apparatus, such as a boiler, furnace, still, and the like, it is often desirable to employ a thermocouple, which is placed in heat intensity relation, for example by a radiation pyrometer, to the apparatus whose temperature is to be ascertained or controlled, and to utilize the electromotive force or current produced or generated by the thermocouple due to changes in temperature of its measuring or hot junction to control indicating or recording devices, or apparatus for controlling the agent, such as the fuel supply, draft, and the like, which establishes the temperature of the apparatus. The electromotive force obtainable from a thermocouple, however, is very feeble being usually of the order of a few millivolts only, and it is out of the question to attempt to get sufficient power from the feeble currents set up in an ordinary thermocouple circuit to operate satisfactorily a pair of contacts or other means for directly controlling a source of auxiliary power. The present invention finds particular application in connection with such a system since the very feeble currents flowing in the thermocouple circuit are suitably amplified to provide sufficient power for the operation of various devices.

Figure 1:
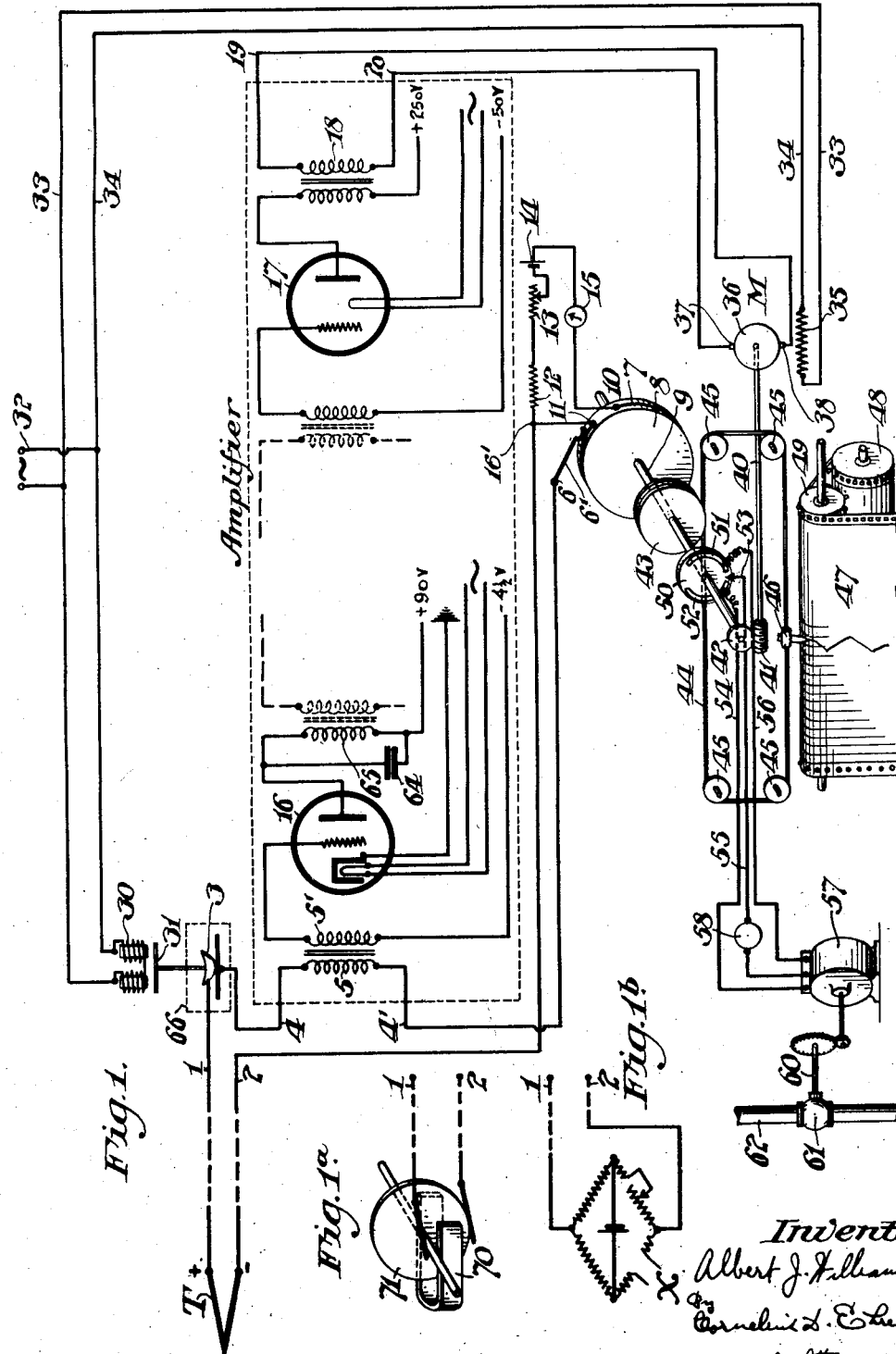
Fig. 1 is a diagrammatic representation of a recording and control system embodying the principles of my invention.

Referring to Fig. 1 of the drawings, a thermocouple T, which is in heat transfer relation to the apparatus whose temperature is to be ascertained, may be located at a distance from the remainder of the circuit, and connected thereto by means of terminals 1 and 2. The positive pole of the thermocouple is connected through terminal 1 to a microphone or other equivalent interrupting or resistance varying means 3, and thence to the input terminal 4 of the thermionic amplifier enclosed within the dotted lines. After passing through the primary winding of input transformer 5 of the amplifier, the thermocouple circuit is connected from input terminal 4' of the amplifier to one terminal 6 of a potentiometer circuit. The potentiometer circuit comprises a sliding contact arm 6' which bears upon a slide wire resistance 7 mounted on the periphery of an insulating drum 8, the drum being rotatably mounted on shaft 9, and operated as hereinafter explained. Included in the potentiometer circuit and connected across the terminals 10 and 11 of the slide wire is a fixed resistance 12, variable resistance 13, and a battery cell 14 which supplies constant current to the potentiometer circuit. A milliammeter or equivalent instrument 15 may be connected in series in the potentiometer circuit to detect or measure the current flowing therein. The negative pole of the thermocouple is connected from terminal 2 to the other terminal 16 of the potentiometer circuit.

The cell 14 is connected in opposition to the thermocouple, and therefore when the resistance of the potentiometer circuit, including the effective potential across the terminals 6 and 16' is equal to the potential produced in the thermocouple circuit, the potentials of the circuits are equal and opposite and there will be no current flow through the microphone. The values of the resistance 12 and variable resistance 13 are made such that for a given position of the contact 6' along the slide wire 7, when a predetermined temperature is maintained in the apparatus to which the thermocouple is responsive, the potential or voltage of the current generated by the thermocouple will just equal the voltage of the potentiometer circuit, under which condition no current will flow in the microphone circuit.

When the temperature of the apparatus measured increases or decreases from a predetermined magnitude, however, the potential generated by the thermocouple will be correspondingly larger or smaller, and in either case an unbalanced condition between the thermocouple and potentiometer circuits obtains and current flows through the microphone and amplifier; when the temperature increases from a predetermined magnitude the current will flow in a direction from the positive pole of the thermocouple because there will be a greater potential produced by the thermocouple than the opposing potential of the potentiometer circuit, and when the temperature decreases from the predetermined magnitude the potential of the thermocouple is less than that of the potentiometer circuit and current will flow in the opposite direction through the microphone and amplifier. The voltage and direction of the current flowing when an unbalanced condition obtains will therefore vary in accordance with the departure from a predetermined magnitude of temperature.

The resistance of the microphone 3 is periodically varied by means of an electromagnetic vibrator 30 having its armature 31 operatively connected to the microphone button, the vibrator armature being actuated from the alternating current supply line 32 which is preferably, although not necessarily, a source of 60 cycle current. This periodic variation of the current flowing when an unbalanced condition obtains causes the potential of the grid of the first amplifier tube 16 to be periodically varied, as follows:

The magnitude of the potential across the secondary winding 5' of the input transformer, and therefore the potential impressed upon the grid of the input tube, is a function of the rate of change of current in the primary winding 5 of the transformer, or with any given resistance and rate of change of resistance in microphone 3, it is a function of the net or unbalanced voltage existing in the microphone circuit.

When the thermo-couple and potentiometer voltages are unbalanced, current flows through the primary 5 in one direction or the other depending upon which voltage is the greater, and the phase relation between the currents in the field and armature of motor M is therefore determined by the sense of unbalance.

The potential variations on the grid of tube 16 are amplified by the successive stages of the audio-frequency amplifier. Only the first and last stages of the amplifier, which may comprise any of the various well-known types suitable for the purpose, are shown in the drawings, and as many intermediate stages may be employed as are necessary to produce the desired power output. The output of the last stage, which preferably comprises a power tube 17, is delivered through the transformer 18 to the output terminals 19 and 20 of the amplifier. There is thus impressed upon the output terminals an alternating current having a predetermined phase relation with respect to that of the alternating current supply line, and whose magnitude is dependent upon the potential applied to the grid of the input tube. The magnitude and phase of the output current is therefore dependent upon and varies as the magnitude and direction, respectively, of the current flowing in the microphone circuit. At any instant the output current will, in general, be either in phase, or 180° out of phase, with the alternating current supply line, dependent upon the number of amplifier stages employed and the manner in which they are connected. It is not essential that the output transformer 18 be employed, since the alternating current component of the plate current of the output tube may be employed to actuate alternating current structure in the manner hereinafter described.

An alternating current commutator type of motor M has its field winding 35 energized from the supply line 32 by means of conductors 33 and 34, with its armature 36 connected by means of the commutator and brushes 37 and 38 to the output terminals 19 and 20 of the amplifier. When the current is flowing through the armature in one direction with respect to the alternating current supply line, the motor armature will revolve in a given direction; if the current is flowing through the armature in the opposite direction with respect to the alternating current supply line, the motor will revolve in the opposite direction. The motor controls, by means of shaft 40, gears 41 and 42, and shaft 9, the position of slide wire drum 8 of the potentiometer, and the connections are made so that when the potentiometer and thermocouple circuits are unbalanced, the motor will drive the drum 8 in either direction, dependent upon whether the voltage across the thermocouple is greater or less than that across the potentiometer, until a neutral position of the potentiometer is obtained, in which position the potentials of the respective circuits will again balance each other. The position of the drum 8 therefore accurately represents the voltage of the thermocouple T.

An important feature of the arrangement is that the potentiometer circuit is very rapidly rebalanced and without overshooting. The armature current of the motor M and hence its speed is a function of the extent of unbalance so that assuming a sudden change of temperature a large current is supplied to the motor armature which rotates at high speed to effect rapid rebalancing movement of slidewire disc 8; however, as balance is approached less and less current is supplied, the motor speed progressively decreasing as the balance point is approached.

Unless the motor has a suitable damping characteristic, it is preferable to attach to it a device affording damping proportional to speed; for example, as shown in Fig. 1c, a conducting disk D, as of copper, may be fastened to the motor shaft 40 for rotation within a magnetic field as provided for example by a permanent magnet E; or as shown in Fig. 1d, a fan F, of either the propeller or centrifugal type, may be rotated by motor M. In either case, by design or adjustment of the damping device, the pen is made to come to rest at the balance point of the system and does not overshoot due to the inertia of the motor armature and other moving parts. If the damping is too low, the pen will oscillate about the balance point before finally coming to rest, while if the damping is excessive, the pen will approach the balance point more slowly than necessary impairing the ability of the system closely to follow the more rapid changes of the condition under measurement.

A condenser 64 is preferably, although not necessarily, connected across the transformer winding 65 of the plate circuit of the various amplifier stages to form therewith a circuit tuned to a frequency slightly less than the frequency of the current to be amplified. For example, where a 60 cycle current is to be amplified the plate circuit is tuned to approximately 50 cycles, the purpose of this being to prevent the passing of frequencies higher than 60 cycles, and thus prevent the introduction of disturbing high frequencies. It will also be understood that the various filament, grid and plate voltages indicated are merely those found suitable in one particular arrangement, and that such values will vary widely, dependent upon the type of amplifier employed and the purpose for which the control apparatus is used.

The use of the microphone in the manner shown results in an arrangement of high sensitivity, but having great stability. Also the speed of response of the arrangement permits the use of the null-type recorder hereinafter referred to, the important advantage of which is that no current flows through the circuit at the time when a measurement is made so that the measurement is independent of the circuit resistance.

When a microphone is employed, it offers no exposure to inductive effects of magnetic or other electric fields in the proximity of the microphone, and itself produces no electromotive force or inductive effect, which effects are apt to be superimposed upon or otherwise vary the feeble currents, and thus introduce error in the system. The microphone, as operated in the manner shown, permits the amplification of the feeble currents by a thermionic amplifier to obtain relatively large power without distortion. The microphone is preferably, although not necessarily, enclosed in a magnetic and electrostatic shield, indicated by dotted lines at 66, as a further precaution against the effect of stray fields.

Connected to the shaft 9 is a drum 43 about which is wound an endless belt 44 which passes over pulleys 45 and to which is attached a stylus pen 46 which bears against a recording sheet 47. The recording sheet is unwound from a roll 48 and is driven at a uniform rate by teeth or pins on roller 49 which engage perforations in the edge of the sheet, and since the magnitude of the temperature is recorded at every instant by stylus 46, the recording sheet presents an accurate record with respect to time of the temperature conditions obtaining in the apparatus.

An auxiliary drum 50 has a plurality of arcuate contact plates 51 and 52 in spaced relation about its periphery with a sliding contact 53 adapted to engage either of the plates 51 and 52, dependent upon the direction of rotation of the disk from a neutral position. Conductors 54, 55 and 56 connect the contact 53 and the plates 51 and 52 to a motor 57. The motor is preferably of the split-field type, one field winding being energized when the circuit is closed between the contact 53 and plate 51 to cause the motor to revolve in one direction, the other field winding being energized when the contact 53 energizes the plate 52 upon the revolution of the disk in the opposite direction. A source of energizing current is indicated at 58 and may be either direct or alternating dependent upon the type of motor used. The motor is used to drive through suitable gearing a shaft 60 which controls the position of the valve 61 of a pipe line or duct 62. The line 62 may supply fuel to the furnace whose temperature it is desired to control, or it may comprise a draft system or any other agent for establishing the magnitude of the condition to be maintained.

Any other suitably arranged electrical structure, such as reversible relay means, and the like, may be used instead of the motor M to control motors or devices for actuating the recorder, slide wire drum, or other apparatus, or to control other electrical circuits for any desired purpose.

In Figs. 1a and 1b are shown other typical circuits for producing a varying electromotive force which is representative of a condition desired to be determined or maintained. Fig. 1a shows a generator comprising a magnet 70, between the poles of which is rotated a copper disk 71, the electromotive force obtained across the terminals of the generator varying in accordance with the speed of rotation of disk 71, and thus the speed of any apparatus may be readily determined and/or maintained in the same manner as the condition of temperature is determined or maintained in the system of Fig. 1. Fig. 1b is a diagrammatic representation of a Wheatstone bridge, in which when unbalanced due to change in magnitude of a condition under measurement the current may flow to terminals 1 and 2, the value of which will be dependent upon the condition obtaining in the unknown circuit X.

Figure 2:
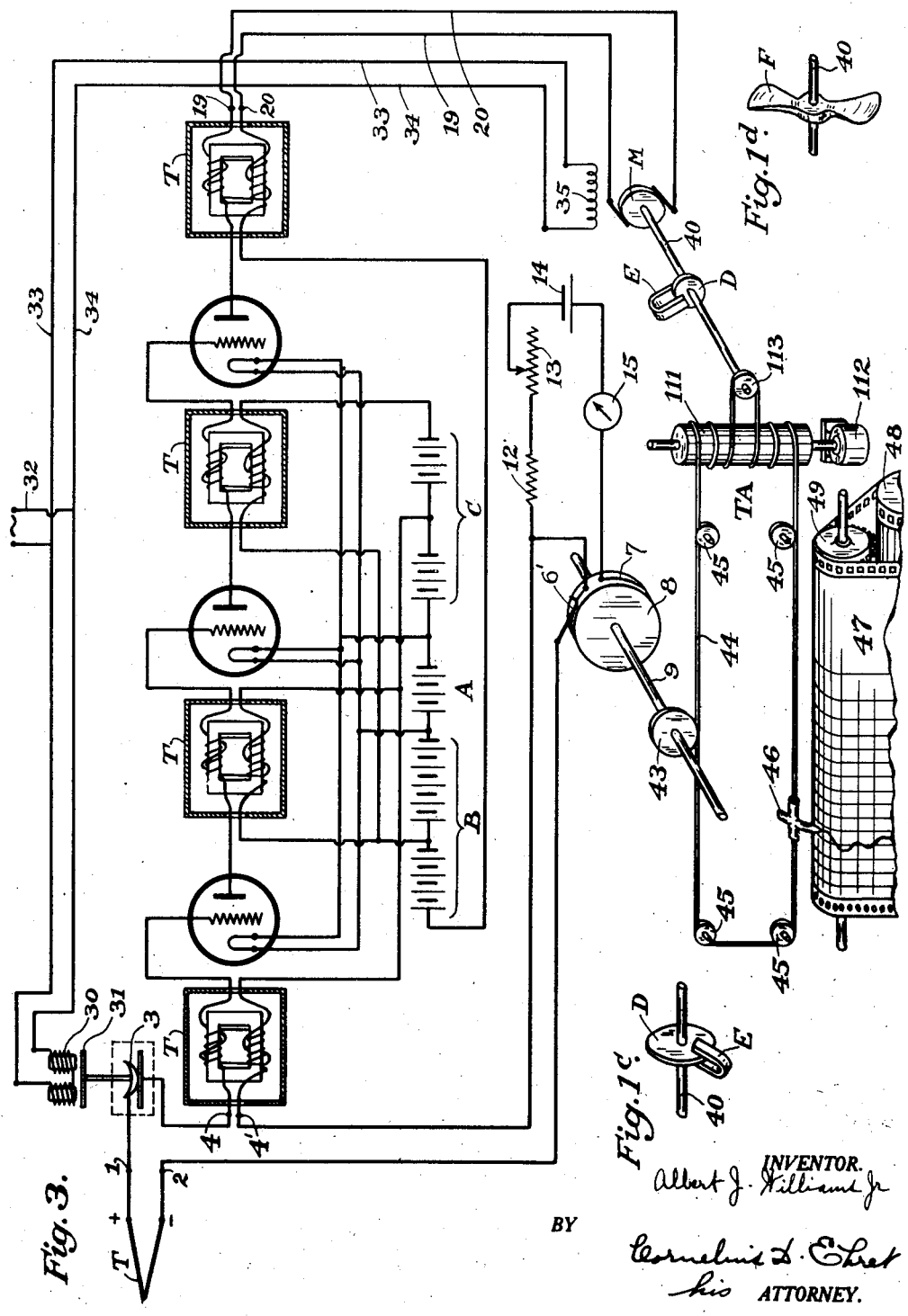
Fig. 2 is a modification of the arrangement of Fig. 1.

Fig. 2 shows a modification of my invention as applied to a potentiometer recorder, in which only one amplifier tube is employed. The circuits are shown schematically, and function in substantially the same manner as that of the arrangement of Fig. 1. When an unbalanced condition obtains between the thermocouple and potentiometer circuits, a varying current will flow through the primary winding 70 of the input transformer, which is preferably a step-up transformer, and its alternating current component will be impressed by means of secondary winding 70' upon the grid of the thermionic amplifier tube 71. A suitable biasing potential is impressed upon the grid in any desired manner, as, for example, by the battery C.

The output or plate circuit of the amplifier tube is connected to a source of plate supply B, and to the movable coil 36' of an alternating current galvanometer, the fixed coil 35' of which is connected to the source of alternating current which energizes the receiver 30. The alternating current component of the output current of the amplifier bears a definite phase relation to the alternating current supply line 32, and also varies in magnitude, in accordance with the departure from a predetermined magnitude of temperature, and thus the galvanometer coil will be deflected in either direction, and to a given extent, in accordance therewith. The movable coil of the galvanometer controls mechanical relay apparatus, which in turn operates recording mechanism as follows:

As shown in the drawings, the control apparatus comprises a suitable motor, as the electrical motor 72, which rotates the shaft 75, preferably at substantially constant speed, and the shaft in turn drives a worm 76 which meshes with and drives worm gear 77 secured upon the shaft 78 having suitable bearings on a frame, not shown To the back of the lever 79, pivoted to the aforesaid frame, is secured a bracket, not shown, and between the bracket and member 79 and carried by them, is a pivot 80 on which the arm 81 is pivotally mounted. On each end of the arm 81 is a shoe 82, of cork, or equivalent material, frictionally engaging the rim 83 of the clutch disk or wheel 84 secured upon a shaft 85 having a suitable bearing, not shown. Secured upon the shaft 78 is a cam 86 which periodically engages the lever 79 and moves it outwardly in opposition to a spring, not shown, thereby lifting the shoes 82 free from the rim 83 of the wheel 84, the aforesaid spring returning the shoes 82 into engagement with the rim 83 after predetermined rotation of cam 86.

Upon the shaft 78 is secured a second cam 87 which, immediately after the cam 86 has caused the lifting of shoes 82 from rim 83, engages the end of finger 88, on the lower end of arm 89, which is secured at its upper end to the member 90, whose arms 91 are pivoted to the aforesaid frame. Upon the frame or member 90 is secured the member 92, whose upper edge 93 is inclined and increases in height from the centre outwardly. Disposed immediately above the edge 93 is the needle or pointer 94 of the galvanometer coil 36', and at opposite ends of the member 92 are the abutments 96 for limiting the deflection or swing of the needle 94. Directly above the needle and beneath which it normally freely swings are the edges 97, preferably straight horizontal edges, upon the members 98 pivoted at 99 to a bracket, not shown, mounted on the aforesaid frame. The members 98 extend toward each other leaving a gap of sufficient width between their ends to allow the free entry of the needle 94 when the same is in balanced, zero, or mid position, the needle 94 normally swinging freely between the edges 93 of member 92 and the lower edges of the members 98. The members 98 have the downwardly extending arms 100 drawn toward each other by the spring 101. Associated with the lower ends of arms 100 are the pins 102 upon the triangular member 103 operatively secured to the member 81.

At each end of the arm or member 81 are the metal ears or projections 104, adapted to be engaged by the cams 105, similar in shape and similarly positioned upon shaft 78.

The disk 8, which carries the slide wire 7 of the potentiometer circuit is secured upon the shaft 85. An arm or member 108 may also be secured upon the shaft, and utilized for actuating a movable switch contact 109 into engagement with a fixed contact 110 to control an auxiliary circuit, as hereinafter more fully described.

In the example herein illustrated, the galvanometer coil 36' cooperates with the potentiometer circuit as in prior Letters Patent to Leeds No. 1,332,182. It will be understood, however, that the coil 36' may be used in association with any other suitable circuit arrangement adapted to the apparatus herein described, or to any equivalent control apparatus or system.

The operation is as follows:

When an unbalanced condition obtains between the thermocouple and the potentiometer circuits, an alternating current will flow through the galvanometer coil 36', and the needle 94 will be deflected in either direction, and to a predetermined extent, dependent upon the phase relation between the alternating component of the plate or output current of the thermionic rectifier and the current flowing in the fixed coil 35' of the galvanometer, and the magnitude of the alternating current in the movable coil.

Assume, for the purposes of illustration, that the phase relation between the currents flowing in the movable and fixed coils of the galvanometer is such that the needle 94 will be deflected toward the left, the needle being deflected to a position between the edge 93 of member 92 and the lower edge 97 of the left hand member 98; the cam 86, driven by the constantly rotating shaft 78, will first tilt the member 79 and lift the shoes 82 from the rim 83 of the wheel 84; immediately thereafter, and while the shoes 82 are still raised from the rim 83, the cam 87 will raise the frame 90 and the attached member 92 and clamp the now deflected needle 94 between the edge 93 and the lower edge 97 of the left-hand member 98, causing the latter member to rise and rotate about its pivot 99, causing the lower end of the left-hand arm 100 to force the left-hand pin 102 toward the right, thereby tilting the arm 81 in a counter-clockwise direction through an angle whose extent is dependent upon or proportional to the extent of deflection of the needle 94. After the cam 87 has released the frame 90, the cam 86 will allow the member 79 to return under the influence of the spring, not shown, to its normal position and bring the shoes 82 into engagement with the rim 83 of the wheel 84 in the angular position to which the arm 81 has been moved. Thereafter, the right-hand cam 105 will engage the right-hand contact ear 104 on the arm 81 and rotate it and wheel 84 and the shaft 85 clockwise to a position where arm 81 is again in normal position.

Clockwise rotation of shaft 85 effects similar rotation of the disk 8 to move the slide wire resistance 7 with respect to contact arm 6' to such position that the voltage across the potentiometer circuit will be equal and opposite to that produced by the thermocouple T. It may be that the first movement of disk 8 does not move the slide wire to such a position as to produce a balance; however, succeeding revolutions of shaft 78 will finally produce a balance, and when attained, the needle 94, when raised by the edges 93, passes freely into the gap between the horizontal arms of member 98 without affecting either arm.

The arm 108 is adjustable and may be so positioned on the shaft 85 that when balance is attained as aforesaid, the end thereof has moved the movable switch element 109 into engagement with the fixed contact 110, and the auxiliary circuit controlled by the switch contacts will be closed. This circuit may be connected to indicating devices of any suitable type to show that the desired temperature condition is being maintained, or any other auxiliary apparatus. Or, arm 108 may be so positioned that it will close the switch contacts 109 and 110 when there is a predetermined departure from a desired temperature condition, and in this case the circuit controlled by the switch contacts may be employed to energize an alarm or other indicating device.

The sensitivity of the arrangement of Fig. 2 may be increased by interposing a filter between the movable coil 36' and the plate circuit which will cause the alternating current component to be applied to the galvanometer coil, but which will prevent the flow of direct current through the coil. Various filters suitable for this purpose are well known in the art, and need not therefore be described here in detail.

A graphic record of the temperature of the thermocouple T may be obtained in the manner of Fig. 1, in which the grooved pulley or drum 43 causes the violin string 44 to move the marker or recorder pen 46 with respect to the recorder paper 47, stored upon the roll 48, and having marginal perforations engaging the teeth or pins of the roller 49, secured upon the shaft 111 which is driven by the shaft 78 through the worm and gear drive shown.

Figure 3:
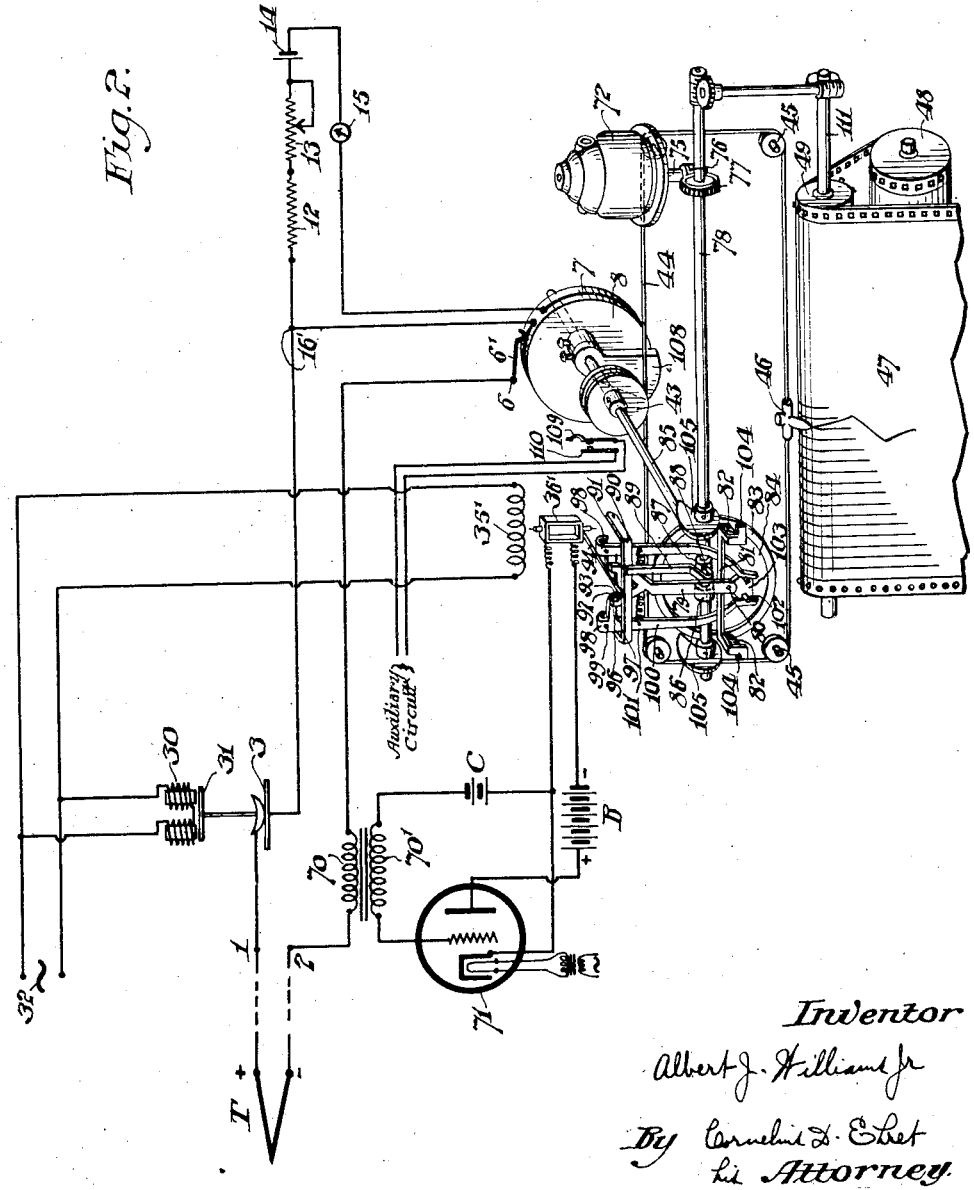
Fig. 3 illustrates another modification of Fig. 1 utilizing a torque amplifier.

In many respects the system shown in Fig. 3 is similar to the preceding modifications, particularly Fig. 1. Corresponding elements are therefore identified by the same reference characters. In this modification, the control motor M is relieved of substantially all of the load of driving the slide wire disk, recorder, pen, etc., by the torque-amplifier TA which comprises a cylinder 111 driven continuously by motor 112. The driving cord 44 for the slide-wire pulley 43 and the recorder pen 46 passes over the pulley 113 on shaft 40 of motor M and then is rather loosely wound in opposite directions on cylinder 111.

With the motor M at rest, the driving forces exerted by cylinder 111 upon cord 44 balance out. When, however, motor M rotates in one direction, the turns of 44 wound in one direction are tightened while those wound in the other direction are loosened whereupon the rotation of cylinder 111 is effective to move slide wire and pen in one direction or the other depending upon which group of turns are tightened, or primarily upon the sense of unbalance of the electrical network. The greater the speed of motor M, the less the slip between the cylinder and the tighter turns of the cord and the greater the speed of movement of the pen and slide wire.

The ability of the system rapidly to restore itself to a condition of stable balance can be understood by analysis of the rebalancing equation of the system which can best be written in terms of torques on the control motor M.

Let $\theta$=displacement of the motor from position of true balance
$t$=time
$K$=moment of inertia of motor
$D$=damping factor
$U$=torsion coefficient (There is a definite torsion coefficient as the movement of the motor armature through a certain angle displaces the slide wire a proportional amount, giving a proportional direct current unbalance, which gives a proportional A. C. input voltage to the amplifier giving a proportional current to motor M which develops a proportional torque. The overall proportion constant between angle and torque is U.)

The equation can now be written $$K\frac{d\theta}{dt^2}+D\frac{d\theta}{dt}+U\theta=0$$

By adjustment of selection of D, the system can be balanced in a minimum of time without overshooting. The period could be reduced by decreasing K and increasing U, but these are opposing requirements, and the range of values is restricted for the inertia of the parts and the forces that can be developed reach limits. For example, if the armature of the motor is reduced in size to reduce K, the power of the motor also is reduced decreasing U, and vice versa. Hence, for values of K and U determined by practical considerations, the system is made as fast as possible without danger of overshooting by determination or adjustment of D, the damping factor.

Thus far, consideration has not been given to the delay present in various parts of the system. If $\Delta t$ represents the total delay of the various parts, the torque at any instant $t_1$ for a first approximation is $$U\theta_{(t_1-\Delta t)}$$
$$= U\left[\theta_{t_1} - \frac{\Delta t \, d\theta_{t_1}}{dt}\right]$$
$$= U\theta - U\Delta t \frac{d\theta}{dt}$$

The rebalancing equation may then be written as $$K\frac{d^2\theta}{dt^2} + D\frac{d\theta}{dt} - U\Delta t \frac{d\theta}{dt} + U\theta = 0$$

or $$K\frac{d^2\theta}{dt^2} + (D - U\Delta t)\frac{d\theta}{dt} + U\theta = 0$$

from which it appears that it is only necessary suitably to increase D, the damping coefficient, effectively to compensate for any delay.

The foregoing explanation concerns not only the system of Fig. 3 but also the modification of Fig. 1.

As in the modification of Fig. 1, the time required of rebalancing is short without overshooting and the accuracy is of high order. The speed of rebalancing is a function of the unbalance, since the average motor torque is high for great unbalance and becomes progressively less as the unbalance becomes less. The disk D and magnet E, or equivalent, provide damping substantially proportional to the speed of motor M. The net result of the above conditions is that the speed is checked before balance is reached and is gradually reduced to zero as the unbalance is reduced to zero.

Figure 4:
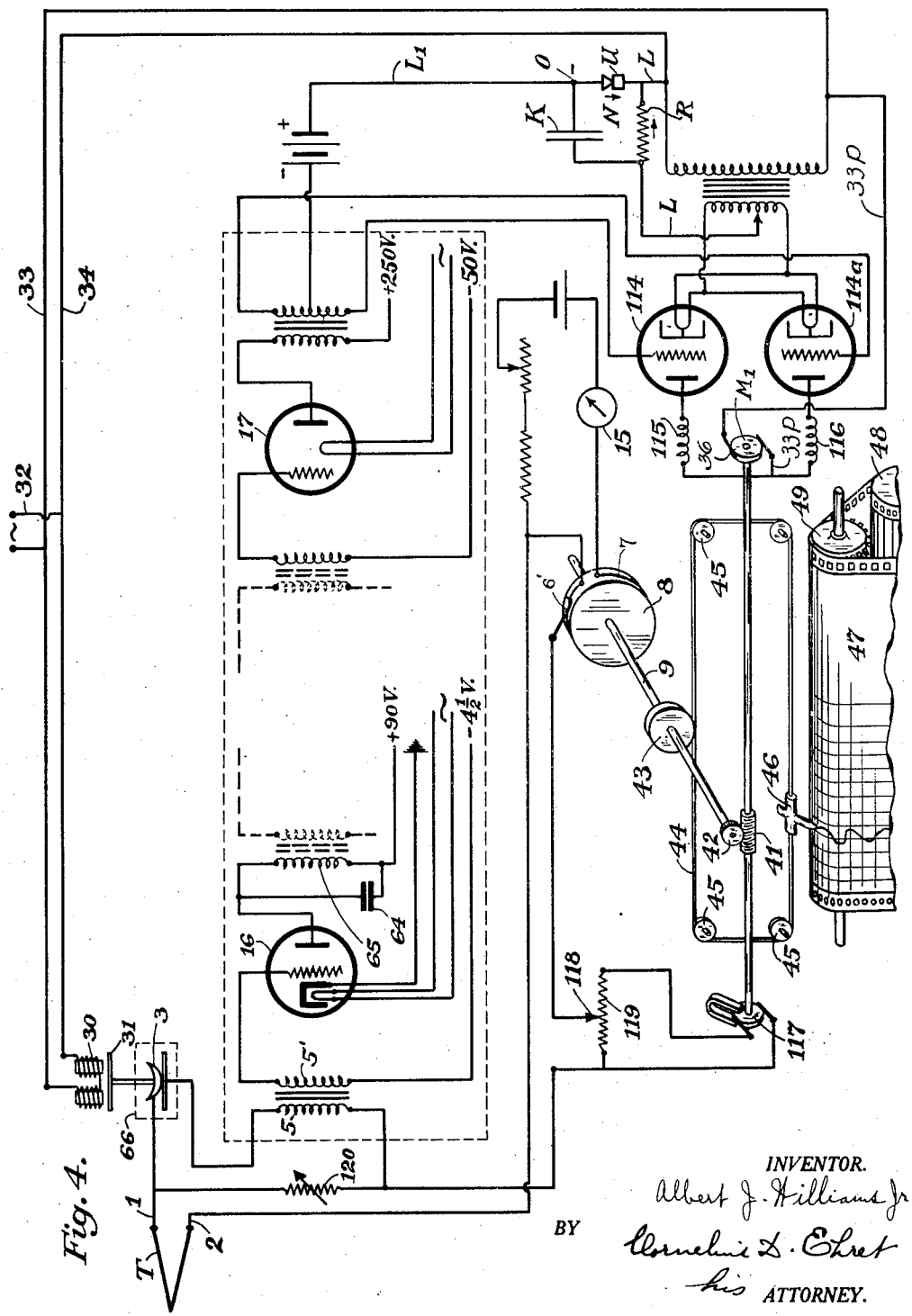
Fig. 4 shows still a further form of the invention using Thyratron tubes.

As the system shown in Fig. 4 is in many respects similar to preceding modifications, particularly Fig. 1, like elements are identified by the same reference characters.

In this modification, the motor MI for driving the slidewire is of the split-field series type having its armature 36 in the common plate conductor 33p of two tubes 114, 114a, preferably Thyratrons, whose grids are connected in push-pull relation to the secondary of the transformer, in the final stage of the amplifier, whose output tube need not be a power tube.

When the thermo-couple and potentiometer voltages are balanced, there is no alternating current voltage impressed upon the grids of the tubes. The grids of the Thyratrons are negatively biased so that under this condition there is no flow of current through the fields 115, 116 or armature 36. Upon unbalance of the thermo-couple and potentiometer voltages, the grids of the Thyratrons are alternately positive and negative with respect to their cathodes, one being negative while the other is positive and vice versa. One grid or the other depending upon the sense of the unbalance, is positive while its associated plate is positive so that one or the other of the fields 115 or 116 is energized to effect rotation of motor MI in the proper direction to move the slide wire for rebalancing.

Preferably, and to ensure that the motor speed and the rate of change of its speed during rebalancing shall be substantially proportional to the extent of unbalance, there is introduced into the network, in series with the unbalance voltage, a voltage whose magnitude is a function of the speed of motor M, or more generally to the rate of rebalancing. Specifically, a magneto 117 driven by motor MI is connected in series with the thermo-couple T and the slide wire 7 and is so poled that its generated voltage is in opposition to unbalanced voltage of the slide wire and thermo-couple. Any desired portion of the total voltage of the magneto may be introduced into the network by adjustment of contact 118 along resistance 119 connected in shunt to the magneto. The magneto and its connection comprise the functional equivalent of the mechanical damping devices above described. They may be incorporated in the system of Fig. 1 for instance instead of the damping devices of Figs. 1a or 1b, or the like.

The sensitivity of the system may be adjusted by variation of resistance 120 which shunts the microphone 3 and the input coil 5 of the amplifier; a feature which may be used for all of the other modifications as well.

It has been found in practice that some Thyratrons exhibit different sensitivities for the same input voltages for different conditions of operation; for example, a relatively small input voltage will allow plate current to flow if applied shortly after the tube has operated. Otherwise stated, a Thyratron may be in a more sensitive condition if it has just operated than if it has been quiescent for some time. This is obviously undesirable. To overcome this defect, the network N is utilized to desensitize the tubes and to allow them to gradually resume original sensitivity. The resistance R of the network of suitable value, for example of the order of 15 ohms, is included in the common cathode return lead L of the grid and plate circuits of the tubes. The grid return lead L1 is connected at the point o, the common terminal of a condenser K, of suitable magnitude, for example 4 microfarads, and a rectifier U.

Assuming that the apparatus has just been put in operation, or that there has been no change in the condition under measurement for some time, the potential of point o is the same as the cathode potential. However, when the tube operates in response to change in the condition under measurement, there is flow of plate current through the resistor R producing a difference of potential across the condenser K and rectifier U in series. The condenser K is therefore charged through the rectifier making the cathodes more positive than the grids. So long as the charge remains, a higher grid voltage than before is necessary to operate or cause "firing" of the tube compensating for the tendency of the tube to be more sensitive if it has previously operated. The condensed charge gradually leaks off through resistance R and rectifier U which are in shunt to the condenser and so provide a leakage path, gradually restoring the grid potential toward its normal value, compensating for the tendency of the tube to be less sensitive the greater the time since its last operation.

The compensating or desensitizing network may be utilized to advantage in any control system using Thyratrons.

In each of the modifications and as diagrammatically shown in Fig. 3, the transformers for coupling the amplifier tubes to each other and to the input and output systems are preferably of the shielded, balanced type described and claimed in my Patent No. 1,916,352, issued July 4, 1933, upon application Serial No. 590,331, filed February 2, 1932, of which this application is in part a continuation.

This application is a continuation in part of my copending application Serial No. 569,126 filed October 15, 1931.

What I claim is:

1. The method of determining the magnitude of a condition, which consists in producing an electromotive force which varies in amplitude and direction in accordance with the departure from a predetermined magnitude of the condition, periodically varying the amplitude of the current flow established by said electromotive force, amplifying the resultant and producing an alternating current which varies in amplitude and phase in accordance with the amplitude and direction, respectively, of the electromotive force, and controlling the actuation of structure for decreasing said electromotive force in accordance with the amplitude of the alternating current.

2. The method of determining the magnitude of a condition, which consists in producing an electrical effect which varies in amplitude and direction in accordance with the magnitude of the condition, producing a second electrical effect which is alternating in character and representative of the amplitude and direction of the first electrical effect, and causing the second effect to control the actuation of structure in accordance with the magnitude of the said condition to reduce said electrical effect.

3. The method of determining the magnitude of a condition, which consists in producing an electromotive force which varies in amplitude and direction in accordance with the magnitude of the condition, producing a second electromotive force which is alternating in character and representative of the amplitude and direction of the said electromotive force, and causing the second electromotive force to control the actuation of structure in accordance with the magnitude of the said condition to reduce said first electromotive force.

4. A system for determining the magnitude of a condition, comprising means for producing an electrical effect which varies in amplitude and direction in accordance with the magnitude of the condition, means for producing a second electrical effect which is alternating in character and representative of the amplitude and direction of the first electrical effect, and means responsive to the second effect for controlling the actuation of structure in accordance with the magnitude of the said condition to reduce said first electrical effect.

5. A system for determining the magnitude of a condition, comprising means for producing an electromotive force which varies in amplitude and direction in accordance with the departure from a predetermined magnitude of the condition, means for producing a second electromotive force which is alternating in character and representative of the amplitude and direction of the first named electromotive force, and means responsive to the second electromotive force to control the actuation of structure in accordance with the magnitude of the said condition to decrease said first electromotive force.

6. A system for determining the magnitude of a condition comprising means for producing a direct current which varies in voltage and direction in accordance with the departure from a predetermined magnitude of the condition, means for periodically varying the amplitude of the direct current, means for amplifying the resultant current and for producing an alternating current varying in amplitude and phase in accordance with the voltage and direction, respectively, of the direct current, and means responsive to said alternating current for controlling the actuation of structure in accordance with the amplitude and phase of the alternating current to reduce said direct current.

7. A system for determining the magnitude of a condition comprising means for producing a direct current which varies in voltage and direction in accordance with the departure from a predetermined magnitude of the condition, means for periodically varying the amplitude of the direct current at the frequency of a given source of alternating current supply, means for amplifying the resultant and for producing an alternating current varying in amplitude and phase in accordance with the amplitude and direction respectively, of the direct current, and means connected to said given source of supply and to the output of the amplifier, and responsive to the resultant effect of the said alternating currents for controlling the actuation of structure in accordance with the magnitude of the said condition to reduce said direct current.

8. Means for determining the magnitude of a condition, comprising means for producing a direct current varying in voltage and direction in accordance with the departure from a predetermined magnitude of the condition, means comprising a variable impedance for periodically varying the amplitude of the direct current at the frequency of a given alternating current supply line, means for impressing the resultant upon the input circuit of a thermionic amplifier, a motive device powered from said alternating current supply line, and having a control winding, and means for impressing the output of said amplifier upon said control winding.

9. Means for determining the magnitude of a condition, comprising means for producing a direct current varying in voltage and direction in accordance with the departure from a predetermined magnitude of the condition, means comprising a microphone for varying the amplitude of the direct current at the frequency of a given alternating current supply line, means for impressing the resultant upon the input circuit of a thermionic amplifier, a reversible motor having its field winding powered from said alternating current supply line, and having its armature connected to the output of said amplifier, whereby the direction of rotation and extent of movement of said motor is controlled by the phase and magnitude of the output current from the amplifier.

10. Control apparatus comprising means for producing a direct current varying in voltage and direction in accordance with the departure from a predetermined magnitude of a condition, a microphone connected in circuit with said means, a potentiometer connected in circuit with a source of current in opposition to said means so that when there is no departure from said predetermined magnitude of condition the voltages of the circuits will balance each other and no current will flow through the microphone, means for periodically vibrating said microphone at the frequency of a given alternating current supply line to periodically vary the amplitude of the current flowing when an unbalanced condition obtains, means for impressing the current upon the input circuit of a thermionic amplifier, means comprising electrical structure for controlling the position of the potentiometer contact arm, and having an energizing winding powered from said alternating current supply line, and a coacting winding of said electrical structure being connected to the output of said amplifier, whereby the electrical structure will cause the potentiometer contact arm to be shifted to a neutral position to restore the balance of the circuits.

11. A high-speed recorder system comprising means responsive to change in magnitude of a condition for unbalancing said system to corresponding extent, structure movable to effect rebalance of the system, a recorder element, motive means for said structure and said element, means for energizing said motive means continuously in accordance with the sense and extent of unbalance to effect rebalance at a speed which decreases as said structure approaches balance, and means responsive to the speed of said motor for controlling its deceleration to ensure movement of said structure to balance position without overshooting and in substantially minimum time.

12. A high-speed recorder system comprising means responsive to change in magnitude of a condition for unbalancing said system to corresponding extent, a marker, structure movable to rebalance said system, a motor whose torque is substantially proportional to the unbalance of said system, and a torque amplifier comprising motive means and means associated therewith controlled by said motor to produce a torque substantially proportional to the extent of unbalance of said system for actuating said marker and said structure.

13. A high-speed recorder system comprising means responsive to change in magnitude of a condition for unbalancing said system to corresponding extent, a marker, structure movable to rebalance said system, a motor whose torque is substantially proportional to the unbalance of said system, means for applying to said motor a retarding torque substantially proportional to the motor speed, and a torque amplifier interposed between said motor and said marker and said structure.

14. A high-speed measuring system comprising a potentiometer network, means responsive to change in magnitude of a condition for producing an unbalanced electromotive force in said network, a generator for producing an opposing electromotive force, an impedance adjustable to rebalance said network, and a motor for adjusting said impedance and driving said generator energized in accordance with the resultant of said opposing electromotive forces.

15. A system for recording the changes in magnitude of a condition which comprises a network unbalanced by changes in magnitude of the condition to produce a direct current which varies in voltage and direction according to the extent and sense of the change, means for periodically varying the amplitude of the direct current, a marker, means for rebalancing said network, motive means for actuating said marker and said rebalancing means, and means for controlling said motive means including means for amplifying said periodically varied current.

16. The method of maintaining a predetermined magnitude of a condition which comprises producing an electromotive force which varies in amplitude and direction in accordance with the departure from said predetermined magnitude, periodically varying the amplitude of the current flow established by said electromotive force, amplifying the resultant and producing an alternating current which varies in amplitude and phase in accordance with the amplitude and direction, respectively, of the electromotive force, and controlling the actuation of structure in accordance with the amplitude of the alternating current to restore said condition to said predetermined magnitude.

17. The method of maintaining a predetermined magnitude of a condition which comprises producing an electromotive force which varies in amplitude and direction in accordance with the departure from said predetermined magnitude, periodically varying the amplitude of the current flow established by said electromotive force, amplifying the resultant and producing an alternating current which varies in amplitude and phase in accordance with the amplitude and direction, respectively, of the electromotive force, controlling the actuation of structure in accordance with the amplitude of the alternating current to restore said condition to said predetermined magnitude, producing an electromotive force of magnitude which is a function of the speed of said structure, and controlling the speed of said structure by said electromotive forces jointly.

18. A system for controlling the magnitude of a condition comprising means for producing a direct current upon departure of said condition from a predetermined magnitude, means for periodically varying said direct current, means for amplifying the resultant current and producing an alternating current, structure adjustable to vary the magnitude of said condition, and means for operating said structure including means responsive to said alternating current.

19. A system for controlling the magnitude of a condition comprising means for producing a direct current which varies in voltage and direction in accordance with the departure of said condition from a predetermined magnitude, means for periodically varying the amplitude of said current at the frequency of a source of alternating current, means for amplifying the resultant and for producing an alternating current varying in amplitude and phase in accordance with the amplitude and direction of said direct current, structure adjustable to vary the magnitude of said condition, means for operating said structure connected to said source of alternating current and to the output of the amplifier, and means controlled by said operating means for opposing said direct-current voltage by a voltage of magnitude which is a function of the speed of said operating means.

20. A system comprising an electrical network, means for producing in said network an unbalanced electromotive force, a second means adjustable to rebalance said network, a motor for adjusting said second means, means responsive to the unbalanced electromotive force for controlling the direction of rotation of the motor, and a generator driven by said motor and connected in said network to produce an electromotive force proportional to the motor speed and in opposition to the unbalanced electromotive force.

21. In combination, means responsive to variation in magnitude of a unidirectional voltage for producing an alternating voltage variable in instantaneous polarity and amplitude according to a variable condition or quantity, responsive means energized by said alternating voltage for actuation thereby, and arresting means for interrupting the actuation of said responsive means when its actuation is proportional to said quantity or condition.

22. The combination set forth in claim 21 wherein the "arresting means" comprises means for reducing the derived voltage to zero.

23. In combination, means responsive to variation in magnitude of a variable quantity or condition for producing an unbalanced unidirectional voltage whose polarity and magnitude are determined by the direction and extent of variation of said condition or quantity, means for translating said unbalanced unidirectional voltage into an alternating voltage whose phase and magnitude are determined by the polarity and magnitude of said unidirectional voltage, a graphic recorder comprising a motor energized by said alternating voltage and a marker driven thereby, and arresting means for interrupting the operation of said motor when the actuation of said marker is proportional to said variation comprising a potentiometer driven by the motor for introducing an opposing voltage in the measuring current circuit.

24. In an electric control system, a power motor, a power source therefor, a signal sending device, a generator driven by said motor, means including electron discharge tubes for controlling the speed and direction of said motor in accordance with signal voltages impressed on said tubes, said signal comprising the resultant of the external signal from said device, and a voltage generated by said generator as a function of the direction and speed of rotation of said motor.

25. In a remote control for power motors, the combination with a reversible motor and current source, of means including an electron tube and a controlling signal of varying magnitude and direction for governing the speed and direction of said motor, a small generator driven by said motor, and means for impressing the output thereof to oppose the input signal to said tube.

26. In an arrangement of the class described, a normally balanced primary network including an element cooperating with said network to determine a point of balance therefor, and means responsive to the establishing of the point of balance, a member movable to a position corresponding to the point of balance, a motor controlled by said means for operating said member, a secondary network including a generator operated by said motor in proportion to the speed thereof, said means being responsive to said secondary network in the opposite sense from its response to said primary network and functioning to cause said motor to stop said member in the position corresponding to the point of balance.

27. In a device of the class described, a normally balanced primary network including an element responsive to changing conditions to determine the balance point of said network and means having an active and an inactive condition, said means being responsive to the lack of balance of said primary network to establish its active condition, a member movable to restore the balance of said network and thereby cause said means to return to its inactive condition, driving mechanism controlled by said means in its active condition for operating said member, and a secondary network having current generating mechanism connected therein which is controlled by said driving mechanism in proportion to its speed, said means being responsive to said secondary network in the opposite sense from its response to said primary network whereby it returns to its inactive condition when said responses are equal but before said primary network is balanced.

28. The method of restoring the balance of an electrical network unbalanced by a change of an electromotive force therein which comprises adjusting said network in response to the lack of balance thereof and in such a manner as to decrease the lack of balance until a balanced condition is reestablished while simultaneously further decreasing the effect of said change of electromotive force by developing in a portion of said network an electromotive force always of a substantially given value and of opposite effect from said first mentioned electromotive force.

29. The method of restoring the balance of a normally balanced control system which comprises adjusting said system in response to an unbalance thereof and in such a manner as to decrease the amount of unbalance while simultaneously further decreasing the amount of unbalance of the system always a substantially given amount at the commencement of said adjustment until a balanced condition is reestablished.

30. The method of restoring the balance of a normally balanced electrical network which comprises adjusting said network in response to a lack of balance thereof, and in such a manner as to decrease the lack of balance while simultaneously further decreasing the unbalance of the network according to the first power of the rate of adjustment until the balanced condition is reestablished.

31. In a device of the class described, a normally balanced electrical primary network including an element responsive to changing conditions to establish an unbalanced electromotive force in said network, means having an active and an inactive condition, said means being responsive to the lack of electrical balance of said primary network to establish its active condition, a member movable to restore the balance of said network and thereby cause said means to return to its inactive condition, a motor controlled by said means in its active condition for operating said member, a magneto generator driven by said motor and having its output connected to said network so that the electromotive force generated by said magneto generator opposes the unbalanced electromotive force in said network whereby said means returns to its inactive condition before said network is completely balanced.

32. A system comprising a reversible motor, an amplifier whose output system includes said motor, means for producing an electro-motive-force variable in polarity and amplitude in accordance with the sense and magnitude of change of a condition or quantity, means for producing an electro-motive-force whose magnitude is dependent upon the operation of said motor and whose polarity is reversible depending upon the direction of rotation of said motor, and means for impressing upon the input system of said amplifier an electro-motive-force whose magnitude and instantaneous polarity are determined by the resultant of said first and second-named electromotive forces.

33. A system comprising a reversible motor, an amplifier whose output system includes said motor, means for producing an electro-motive-force variable in polarity and amplitude in accordance with the sense and magnitude of change of a condition or quantity, means for producing an electro-motive-force whose magnitude is a function of the speed of said motor and whose polarity is reversible depending upon the direction of rotation of said motor, and means for impressing upon the input system of said amplifier an electro-motive-force whose magnitude and instantaneous polarity are determined by the resultant of said first and second-named electromotive forces.

34. The method of determining the magnitude of a condition which comprises balancing an effect of magnitude determined by the magnitude of said condition against a standard effect, varying said standard effect upon unbalance of said effects in a sense toward restoration of balance, producing an effect of magnitude determined by the rate of change of said standard effect, and controlling the rate of variation of said standard effect to maintain balance of the resultant of said first and second effects with said third effect as rebalance of said first and standard effects is approached.

35. The method of determining the magnitude of a condition which comprises opposing a standard effect to an effect of magnitude determined by the magnitude of said condition, producing an electromotive force of magnitude determined by the unbalance of said effects, varying said standard effect in a sense to restore balance, producing an electromotive force of magnitude determined by the rate of variation of said standard effect, and controlling the rate of variation of said standard effect by said electromotive forces jointly to effect approach to balance of said effects at a rate substantially proportional to the unbalance of said effects.

36. A control system comprising means for producing an effect determined by the magnitude of condition under measurement, means for producing a standard effect, means responsive to unbalance of said effects, structure adjustable to rebalance said effects, a motor for adjusting said structure at a rate controlled by said responsive means, and means for producing an effect of magnitude determined by the speed of said motor and jointly effective to control the speed of said motor.

37. A normally balanced control system including means for producing unbalance thereof upon change in magnitude of a condition being measured, structure adjustable to rebalance said system, a motor for adjusting said structure, means for producing a voltage substantially proportional to the unbalance of said system, means for producing a voltage substantially proportional to the speed of said motor, and means for controlling the speed of said motor in accordance with concurrent magnitudes of said voltages.

38. A normally balanced control system including means for producing unbalance thereof upon change in magnitude of a condition being measured, structure adjustable to rebalance said system, a motor for adjusting said structure, having separately energized windings, means for producing a voltage substantially proportional to the unbalance of said system, means for producing a voltage substantially proportional to the speed of said motor, and an amplifier for supplying one of said motor windings having said voltages impressed on the input circuit thereof whereby the phase relation of the currents in said windings is determined by the unbalance of the system and the rate of rebalance.

39. A normally balanced control system including means for producing unbalance thereof upon change in magnitude of a condition being measured, structure adjustable to rebalance said network, a motor for adjusting said structure, having a split-field winding, means for producing a voltage substantially proportional to the unbalance of said system, means for producing a voltage substantially proportional to the speed of said motor, and relays for selective energization of the sections of said field winding, one of which is operated when said first voltage is preponderant and the other of which is operated when said second voltage is preponderant whereby the speed of said motor is maintained proportional to the unbalance of said system during rebalancing.

40. The method of control which comprises opposing a voltage whose magnitude is determined by the magnitude of a condition to a second voltage, varying the second voltage to reduce the difference between said voltages, producing a voltage whose magnitude is a function of the rate of change of said second voltage, and controlling the rate of change of said second voltage to maintain balance of said third voltage and the difference between said first and second voltages.

41. The method of control which comprises effecting movement of a control member from neutral position in accordance with the change of a condition, effecting a control in accordance with said movement and concurrently returning said control member toward neutral position, producing an effect varying as a function of the rate of return of said member to neutral position, and controlling the rate of return of said control member jointly in accordance with the magnitude of said effect and the distance of said control member from neutral position.

42. A control system comprising a control member movable from neutral position in accordance with the change in magnitude of a condition, a controlled means for effecting a control and returning said control member to neutral position, and means for controlling the speed of said controlled means including means responsive to the speed of return of said control member and to its distance from neutral position.

43. In an electric control system, a power motor, a power source therefor, a signal sending device, a generator driven by said motor, means including electron discharge tubes for controlling the direction of said motor and its speed during deceleration in accordance with signal voltages impressed on said tubes, said signal comprising the resultant of the external signal from said device and a voltage generated by said generator as a function of the direction and speed of rotation of said motor.

44. In a remote control for power motors, the combination with a reversible motor and current source, of means for controlling the direction of said motor and its speed during deceleration comprising an electron tube and a controlling signal therefor of varying magnitude and direction, a small generator driven by said motor, and means for impressing the output thereof to oppose said signal.

45. A high-speed recorder system comprising means responsive to change in magnitude of a condition for unbalancing said system, structure movable to effect rebalance of the system, a recorder element, motive means for said structure and said element, means responsive to the speed of said motor, and means controlled by said responsive means jointly to effect rebalance at a speed which decreases as said structure approaches balance to ensure movement of said structure to balance position without overshooting and in substantially minimum time.

46. A high-speed measuring system comprising an electrical network, means responsive to change in magnitude of a condition for producing in said system an unbalanced electromotive force, an impedance adjustable to rebalance said system, a motor for adjusting said impedance, means driven by said motor to produce in said system an electromotive force proportional to the motor speed and in opposition to said unbalanced electromotive force, and means for controlling the deceleration of the motor, as rebalance is approached, in accordance with the resultant of said electromotive forces.

47. A high-speed measuring system comprising a potentiometer network, means responsive to change in magnitude of a condition for producing an unbalanced voltage in said network, a current generator for producing an opposing voltage, a resistance adjustable to rebalance said network, a motor for adjusting said resistance and driving said generator, and relay means responsive to the resultant of said opposing electromotive forces for controlling said motor.

48. In an arrangement of the class described, a normally balanced primary network including an element cooperating with said network to determine a point of balance therefor, and means responsive to the establishment of balance, a member movable to a position corresponding to the point of balance, a motor controlled by said means for operating said member, and a secondary network cooperating with said motor, said means being responsive to said secondary network always in the opposite sense from its response to said primary network and functioning to cause said motor to stop said member in the position corresponding to the point of balance.

49. In a device of the class described, a normally balanced primary network including an element responsive to changing conditions to unbalance said network and means having an active and an inactive condition, said means being responsive to the lack of balance of said primary network to establish its active condition, a member movable to restore the balance of said network and thereby cause said means to return to its inactive condition, a motor controlled by said means in its active condition for operating said member, a secondary network cooperating with said motor, said means being responsive to said secondary network always in the opposite sense from its response to said primary network whereby it returns to its inactive condition when said responses are equal but before said primary network is balanced.

50. The method of restoring the balance of a normally balanced electrical system which comprises adjusting said electrical system in response to an electrical unbalance thereof and in such a manner as to decrease the amount of electrical unbalance, while simultaneously further decreasing the amount of electrical unbalance of the system at the commencement of the adjustment and additionally an amount varying according to the rate of said adjustment until a balanced condition is reestablished.

51. The method of restoring the balance of an electrical system including a primary network and a related secondary network unbalanced by a change of an electromotive force therein which comprises adjusting said primary network in response to the lack of balance thereof and in such a manner as to decrease said electromotive force until a balanced condition is reestablished, while simultaneously further decreasing said electromotive force by developing in said secondary network an electromotive force of opposite effect from said first-mentioned electromotive force and corresponding to the rate of said adjustment.

52. The method of restoring the balance of an electrical system including a primary network unbalanced by a change of an electromotive force therein, a motor for effecting rebalancing adjustment, and a secondary network, which comprises detecting the unbalance, effecting operation of the motor in accordance with the detected unbalance in proper sense to decrease said electromotive force and until said network is balanced at a new balance point, and effecting decrease of the detected unbalance by developing in said secondary network during deceleration of the motor an electromotive force of opposite effect from said first-mentioned electromotive force to effect temporary balance of said network to control the rate of deceleration of the motor as said new balance point is approached.

53. A system comprising means for producing a direct current which varies in accordance with a change in magnitude of a condition, a source of alternating current, means for producing an alternating current of the same frequency as said source and whose phase and amplitude are determined by the sense and extent of change of said direct current, and electromagnetic means including a winding energized by said produced alternating current, another winding energized from said source, and a rotatable element whose direction and speed are determined by the phase and amplitude of said produced current.

54. A system for controlling the magnitude of a condition comprising means for producing a direct current which varies in accordance with the departure of the condition from a predetermined magnitude, a source of alternating current, means for producing an alternating current of the same frequency as said source and whose phase is determined by the sense of change of said direct current, electromagnetic means including a winding energized by said produced alternating current, another winding energized from said source, and an element whose direction of movement is determined by the phase of said produced current, and means for varying the magnitude of said condition controlled by said movable element.

55. In a positional control for objects having means for producing and receiving a signal, a reversible motor for driving the object, a thermionic tube circuit for controlling said motor as to torque and direction in accordance with the strength and direction of the received signal, and feed back means for producing a D. C. feed back in said circuit upon energization of said motor to drive said object comprising a network including capacity, resistance, and rectifier means.

56. In a positional control for objects having means for producing and receiving a signal, a reversible motor for driving the object, a thermionic tube circuit for controlling said motor as to torque and direction in accordance with the strength and direction of the received signal, and feed back means for producing a D. C. feed back in said circuit upon energization of said motor comprising capacity interposed between the grid and cathode connections of said circuit and resistance and rectifier means in series in a path in shunt to said capacity.

57. The method which comprises producing E. M. F.'s to be measured having very low frequency components which are difficult of direct amplification, opposing said E. M. F.'s to known E. M. F.'s, translating only the resultant of said E. M. F.'s into currents of a regular different frequency which can be readily amplified, amplifying said currents at said frequency, and applying said amplified currents directly to effect a balance between said opposed E. M. F.'s.

58. The method of measuring a unidirectional E. M. F. of minute magnitude which comprises opposing said E. M. F. to a standard E. M. F., translating only the resultant of said opposed E. M. F.'s into a current of regular frequency, amplifying said current, and applying said amplified current directly to effect a balance between said opposed E. M. F.'s.

59. In an instrument of the character described, a potentiometer slide wire, a standard source of E. M. F. for said slide wire, means to connect a source of E. M. F. to be measured to said slide wire to oppose said standard E. M. F. to derive a resultant E. M. F., means to produce from said resultant E. M. F. an oscillating current of fixed frequency, means for amplifying said oscillating current, and means energized by said amplified current to effect a balance between said E. M. F.'s.

60. An instrument of the potentiometer type, a pair of terminals for connection to a source of unidirectional E. M. F., a motor device for automatically adjusting said potentiometer, means between said terminals and said motor for deriving from the residual potentiometer current an oscillating current, and means for amplifying the oscillating current and applying the amplified current to energize said motor device in adjusting said potentiometer.

61. The method of measuring an electromotive force whose fluctuation in magnitude with time comprises components of frequencies difficult of direct amplification which comprises opposing said electromotive force to a reference electromotive force to produce a resultant electrical effect, modifying said resultant electrical effect at readily amplifiable frequency, amplifying said effect at said last-named frequency, and effecting balance of said opposed electromotive forces in response to the amplified effect.

62. A self-balancing system for measurement of electromotive forces too small directly to effect control of said system and whose fluctuation in magnitude with time comprises components of frequencies difficult of direct amplification comprising an electrical system upon which the electromotive force is impressed, means for opposing to said first-named electromotive force a reference electromotive force, means for modifying the resultant effect of the opposing electromotive forces at readily amplifiable frequency, an amplifier associated with said system to amplify at said last-named frequency the resultant effect of said opposed electromotive forces, and means controlled by the amplified resultant effect to effect balance of said electromotive forces.

63. The method of measuring direct currents of minute magnitude which comprises opposing the E. M. F.'s producing said currents to a standard E. M. F. of known magnitude, converting the resultant of said opposed E. M. F.'s into a corresponding alternating current of fixed frequency, amplifying said alternating current at said frequency, reconverting said amplified current into a corresponding unidirectional current, and applying said reconverted current directly to effect a balance between said opposed E. M. F.'s.

64. The method of measurement which comprises producing a unidirectional E. M. F. whose magnitude is to be determined, opposing said E. M. F. by a known unidirectional E. M. F. to produce a resultant E. M. F., deriving directly from the said resultant E. M. F. a corresponding E. M. F. of alternating polarity, amplifying said derived E. M. F. and applying said amplified E. M. F. directly to effect a balance between the first and second mentioned E. M. F.'s.

65. In an instrument of the character described, the combination of means for opposing a unidirectional E. M. F. of known magnitude against an E. M. F. of unknown magnitude, means for balancing said E. M. F.'s, means to derive from the resultant of said opposed E. M. F.'s a corresponding E. M. F. alternating in polarity and of fixed frequency, means for amplifying said derived E. M. F., and means for applying said amplified E. M. F. directly to said balancing means.

66. In an instrument of the character described, the combination of means for opposing a unidirectional E. M. F. of unknown magnitude against a steady E. M. F. of known magnitude, means for balancing said opposed E. M. F.'s, means to derive from the resultant of said opposed E. M. F.'s a corresponding E. M. F. of regular frequency, a grid controlled space discharge amplifier upon which said derived E. M. F. is impressed, and means for balancing said opposed E. M. F.'s upon which means the output from said amplifier is impressed.

67. In an instrument of the character described, the combination of a potentiometer resistance, means for applying a known E. M. F. and an unknown E. M. F. to said resistance in opposing relation to derive a resultant unidirectional E. M. F., means for deriving from said resultant unidirectional E. M. F. a corresponding E. M. F. alternating in polarity, means for amplifying said derived E. M. F., and means energized by said amplified E. M. F. for balancing said unknown E. M. F. against said known E. M. F.

68. The method of balancing a potentiometer to measure a current which is difficult of direct amplification which comprises translating the residual current from said potentiometer into a current having a regular frequency which can be readily amplified, amplifying said current at said frequency, and utilizing the amplified current directly for adjusting the balance of the potentiometer.

69. The combination with a source of small unidirectional electromotive force, of potentiometer measuring means to which said source is connected and comprising an electric motor reversibly rotatable to adjust said means as required to create a potential difference therein normally balancing said electromotive force, said motor comprising two windings and rotating when alternating currents flow through said windings in a direction depending on the phase relation of said currents, means including alternating supply means for energizing one of said windings, and amplifying means energized by the pulsating current to deliver to the other of said windings an alternating current whose phase relation to the current in said one of said windings is determined by the sense of unbalance of said potentiometer means.

70. Apparatus for measuring a variable condition comprising means for producing a unidirectional electromotive force of a magnitude varying with the magnitude of said condition, and cooperating electrical apparatus energized by said force to create pulsating electrical currents of predetermined frequency, and means associated with said apparatus to eliminate the effect of extraneously induced currents.

71. A positional control system comprising a Thyratron, means in the input system of said Thyratron for producing an alternating signal voltage on its grid, a controlled object, reversible motive means in the output system of said Thyratron energized upon firing of the Thyratron to change the position of said object to an extent determined by said signal voltage, and desensitizing means operative upon firing of the Thyratron to derive a direct-current negative biasing potential applied to said grid.

72. A positional control system comprising a Thyratron, means in the input system of said Thyratron for producing an alternating signal voltage on its grid, a controlled object, reversible motive means in the output system of said Thyratron energized upon firing of the Thyratron to change the position of said object to an extent determined by said signal voltage, and desensitizing means operative upon firing of the Thyratron to derive a direct-current negative biasing potential comprising a resistance traversed by unidirectional current upon firing of said Thyratron, a path in shunt to said resistance comprising a condenser and a rectifier in series, and connections from the grid and cathode of the Thyratron to terminals of said condenser.

73. The combination with structure controlled in accordance with the magnitude of a condition, of means for producing a direct current whose voltage and direction of flow vary in accordance with the departure from a predetermined magnitude of a condition, a thermionic amplifier, means for modulating said current and impressing its alternating current component upon the input circuit of the amplifier, transformers in the input and output circuits of a stage of said amplifier, magnetic shielding means for said transformers, and means connected to the output circuit of said amplifier for actuating said controlled structure in accordance with the magnitude of said condition.

74. The combination with structure controlled in accordance with the magnitude of a condition, of means for producing a direct current varying in voltage and direction in accordance with the amount and direction of departure from a predetermined magnitude of the condition, a thermionic amplifier, means including a variable resistance for periodically varying the amplitude of said direct current at the frequency of a given alternating current power line, and for impressing its alternating current component upon the input circuit of the amplifier, transformers in the input and output circuits of one of the amplifier stages, magnetic shielding means enclosing said transformers, and means jointly energized from said power line and an output circuit of the amplifier for determining the position of said controlled structure.

ALBERT J. WILLIAMS, Jr.

Certificate of Correction

Patent No. 2,113,164.     April 5, 1938.

ALBERT J. WILLIAMS, Jr.

It is hereby certified that errors appear in the printed specification of the above numbered patent requiring correction as follows: Page 2, first column, line 29, after the word "feeble" insert a comma; page 4, first column, line 73, after "shown" insert a period; page 5, second column, line 60, in the equation, for $$\text{``}K\frac{d\theta}{dt^2}\text{''} \quad \text{read} \quad K\frac{d^2\theta}{dt^2};$$

page 7, first column, line 31, claim 2, after "said" insert *first*; page 9, first column, line 5, claim 22, for "derived" read *produced*; and that the said Letters Patent should be read with these corrections therein that the same may conform to the record of the case in the Patent Office.

Signed and sealed this 28th day of June, A. D. 1938.

[SEAL]

HENRY VAN ARSDALE,
*Acting Commissioner of Patents.*

Certificate of Correction

Patent No. 2,113,164. April 5, 1938.

ALBERT J. WILLIAMS, Jr.

It is hereby certified that errors appear in the printed specification of the above numbered patent requiring correction as follows: Page 2, first column, line 29, after the word "feeble" insert a comma; page 4, first column, line 73, after "shown" insert a period; page 5, second column, line 60, in the equation, for $$\text{``}K\frac{d\theta}{dt^2}\text{,''} \quad \text{read} \quad K\frac{d^2\theta}{dt^2};$$

page 7, first column, line 31, claim 2, after "said" insert *first*; page 9, first column, line 5, claim 22, for "derived" read *produced*; and that the said Letters Patent should be read with these corrections therein that the same may conform to the record of the case in the Patent Office.

Signed and sealed this 28th day of June, A. D. 1938.

[SEAL]

HENRY VAN ARSDALE,
*Acting Commissioner of Patents.*

DISCLAIMER 2,113,164.—*Albert J. Williams, Jr.*, Philadelphia, Pa. RECORDER AND CONTROL CIRCUITS. Patent dated Apr. 5, 1938. Disclaimer filed June 2, 1947, by the assignee, *Leeds and Northrup Company*.

Hereby enters this disclaimer to claims 37, 41, 42, 44, 48, 49, 50, 51, 52, and 71 of said patent.

[*Official Gazette July 8, 1947.*]